Oct. 12, 1965 J. B. HART ETAL 3,210,986
ELONGATION TESTER
Filed June 18, 1962 2 Sheets-Sheet 1
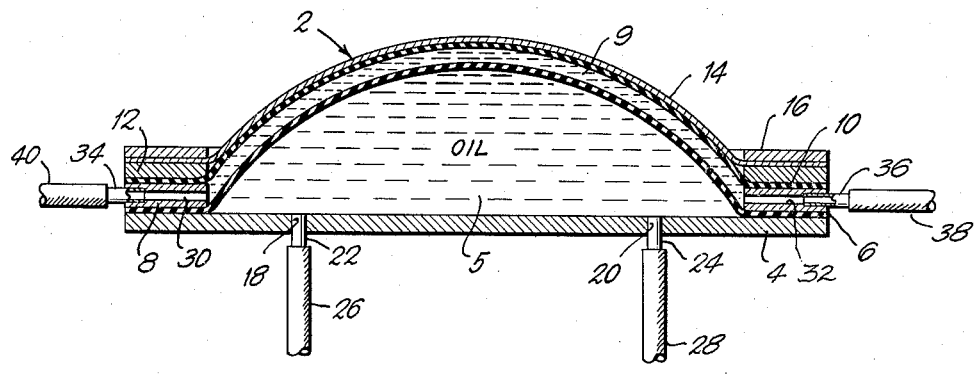
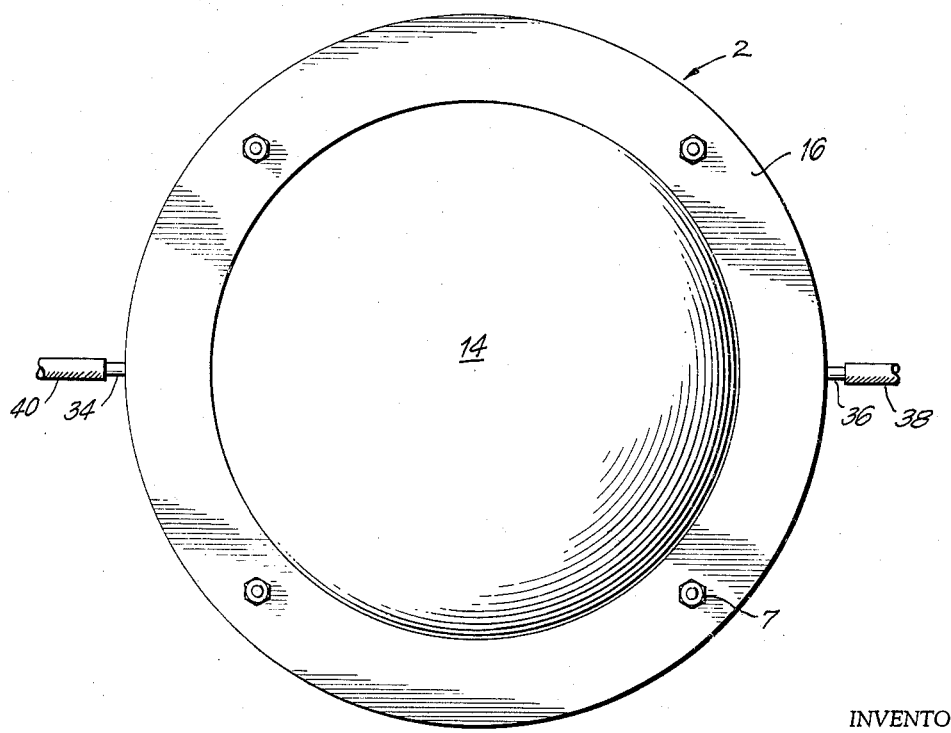
INVENTOR
Jack B. Hart
Eugene B. Butler, Donald R. Cardis
BY Kernon, Palmer, Stewart,
& Estabrook
ATTORNEY Oct. 12, 1965

J. B. HART ETAL 3,210,986

ELONGATION TESTER

Filed June 18, 1962

INVENTORS
Jack B. Hart,
Eugene B. Butler, Donald R. Cardis
BY Kenyon, Palmer, Stewart,
& Estabrook

ATTORNEY

United States Patent Office 3,210,986
Patented Oct. 12, 1965

3,210,986
ELONGATION TESTER
Jack B. Hart, Akron, Eugene B. Butler, Kent, and Donald R. Cardis, Barberton, Ohio, assignors to The General Tire & Rubber Company, a corporation of Ohio
Filed June 18, 1962, Ser. No. 203,400
8 Claims. (Cl. 73—15.6)

This invention relates generally to an improved apparatus for testing the elongation properties and rupture characteristics of materials at controlled temperatures.

This invention relates, more specifically to an elastic diaphragm type tester which enables determination of the properties of various thermo-plastic films, webs and fabrics under the influence of stress of elevated temperature.

There are, at present, diaphragm type testers in use which provide for the testing of various materials under the influence of tensile stress alone. These testers generally consist of a flexible diaphragm system, a source of fluid pressure, and means to retain a test specimen over the diaphragm during the test. Tensile stress is induced in the test specimen in this type of tester by clamping it over the diaphragm system and by stretching it by expanding the diaphragm. The resulting deformation or displacement of the diaphragm and specimen may be measured at incremental pressures to determine the resistivity of the material to deformation. The diaphragm may also be expanded until the test specimen fails thereby yielding the ultimate strength characteristic of the material.

This invention provides a diaphragm type tester in which specimen temperature may be controlled during the testing sequence and also in which the diaphragm temperature may be changed during the testing sequence to provide an additional test of the thermal dimensional variation characteristics of the test specimen under the influence of changing temperature. The testing of these characteristics is of particular importance with respect to thermo-plastic materials and the like in that their physical characteristics are generally effected by changing temperature environment.

This invention embodies a dual diaphragm and pressure system and independent sources of temperature control in each system to provide temperature control and a temperature changing capability for a diaphragm type tester. Specifically, the device includes a diaphragm system which has a pressure plate and a first elastic diaphragm mounted thereon, an annular spacing member over the first diaphragm and a second diaphragm mounted on the annular spacing member to provide two separate laminar sealed chambers in the system. In the embodiment described herein the chamber between the first diaphragm and the pressure plate is connected through the pressure plate to a pressure system which has provision for heating the pressurizing fluid circulating in that system. This system also contains regulators, valves and pumps as is necessary to control the pressure and flow of the fluid in the system. The chamber between the two diaphragms is connected to another pressure system which includes a cooling means to cool the pressurizing fluid circulating in that system. This system also contains regulators, valves and pumps as is necessary to control the flow and pressure of the fluid in the system.

It is therefore an object of this invention to provide a diaphragm type tester in which the temperature of the test specimen may be controlled during the test through control of the temperature of the diaphragm apparatus.

Another object of this invention is to provide a diaphragm type test apparatus in which the temperature of the test specimen may be changed at any point during testing to determine the effect of such change on the test specimen.

It is yet another object of this invention to provide an improved diaphragm type test apparatus in which pressurized fluids having different physical characteristics can be supplied to the diaphragm system in individual separate circuits.

It is still another object of this invention to provide a diaphragm type test apparatus having dual diaphragms with separate pressure chambers and having separate circuits connected to each of the chambers to provide for separate circulation of pressurized fluids having different physical characteristics.

The other objects and advantages of this invention will be better understood by referring to the following drawings and the detailed description thereof where:

FIG. 1 is a side view in section of the diaphragm system;

FIG. 2 is a top plan view of the diaphragm system;

Figure 3:
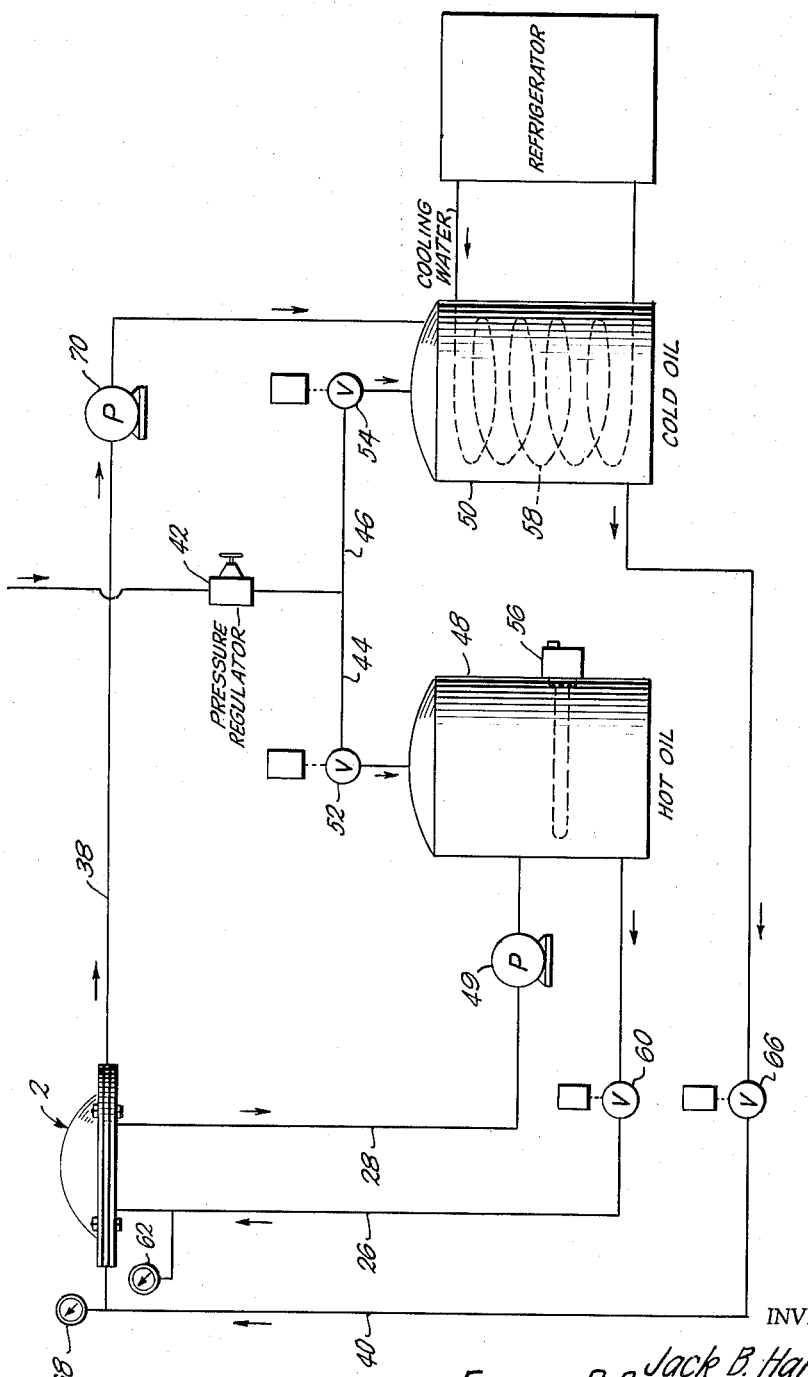
FIG. 3 is a schematic presentation showing an embodiment of the test apparatus and system.

Referring now to FIGS. 1 and 2 the diaphragm system 2 is shown in a cross sectional side view. Lower diaphragm 6 is shown mounted to pressure plate 4. Annular spacing ring 8 is mounted at the periphery of lower diaphragm 6. Upper diaphragm 10 is mounted on spacing ring 8. Clamping ring 12 is mounted over upper diaphragm 10 and serves to retain the diaphragms and spacing ring on the pressure plate 4. The system as thus far described may be permanently held together through the use of adhesives suitable for the purpose which would be placed on the mating faces of the various members. The members, however, are preferably held together through the use of bolts 7 disposed through the respective members into pressure plate 4 or through the use of devices such as C clamps or the like. Test material 14 is shown superimposed over the upper diaphragm 10 and clamping ring 12, being retained thereon by retaining ring 16 demountable attached over the system. This ring may be attached by various means such as C clamps or the like. In this embodiment, the bolts 7 connect the ring as well as the other members of the system.

Pressure plate 4 is provided with ports 18 and 20 which provide supply and return paths to chamber 5, formed by the pressure plate and diaphragm 6, for fluid from one of the pressure systems described below. Nipples 22 and 24 are provided at the ports to facilitate pressure connection to tubes 26 and 28 of the pressure system. These connections may be of any type common in the art such as threaded joints, clamped joints, adhesive joints or permanently welded metal joints. Spacing ring 8 is provided with ports 30 and 32 transversely disposed to the axis of the ring. Nipples 34 and 36 and tubing 38 and 40 serve to connect chamber 9, formed by lower diaphragm 6, upper diaphragm 10 and spacing ring 8, to the fluid circulation from another pressure system to be described below. These connections may be made in various ways as described for the pressure plate connections above.

It is to be understood that any material suitable for the purpose may be used for fabrication of diaphragms 6 and 8. In the embodiment described herein it is contemplated that these diaphragms be fabricated from natural or synthetic sheet rubber but various flexible and resilient plastic materials having the required thermal dimensional stability may also be used. The pressure plate, spacing, clamping and retaining rings are intended to be made from some rigid material, preferably a lightweight metal such as an aluminum alloy having the required strength properties. Other materials such as rigid plastics which have the required thermal dimensional stability and strength properties may be used.

Referring now to FIG. 3 of the drawings, a contemplated embodiment of the invention is shown in schematic form. Fluid from a pressure source is introduced into the system through pressure regulator 42 and then through branch lines 44 and 46 to hot oil tank 48 and cold oil tank 50. Solenoid valves 52 and 54 control the admission of fluid into the respective systems. Hot oil tank 48 is provided with heater and thermostat 56. The heater provided in this embodiment is of the electrical type although clearly gas or oil fired heaters could also be used equally as well. Cold oil tank 50 is provided with cold water coil 58. The water coil is connected to a refrigeration system to provide for continuous cooling of the contents of the tank. It should also be understood that the cooling means may be of any other type well known in the art and, for certain purposes, may only require a source of tap water for cooling purposes.

Hot oil tank 48 is then connected to chamber 5 of the diaphragm system 2 through solenoid valve 60. Gauge 62, connected to line 26, provides a pressure monitoring means for the hot oil system. Return tubing 28 is connected to hot oil tank 48 through pump 49. Cold oil supply tubing 40 conducts fluid from cold oil tank 50 to chamber 9 of the diaphragm system 2 through solenoid valve 66. Gauge 68 serves to provide pressure monitoring of the cold oil system. Return tubing 38 is connected to the cold oil tank 50 through pump 70.

The fluid used in the systems may be of any type suitable for the purpose such as air, water or the like. It is preferred, in this embodiment, that the respective systems contain petroleum oil or the like.

In operation test material 14 is mounted on the diaphragm system 2 through retaining ring 16 and clamped tightly thereto at its periphery by retaining ring 16. Solenoid valve 60 is then opened to introduce fluid into lower chamber 5. Valve 60 may be kept open until the desired elongation of the material is achieved or until it ruptures. The readings of gauge 62 are recorded to determine the corresponding pressure values for the elongation or rupture. Valve 60 may also be closed at desired pressure levels, as determined on gauge 62, and elongation of the test material can be measured by suitable apparatus at various increments of pressure to also determine the resistivity of the material. Through the use of the thermostatically controlled heater these tests may be duplicated at various temperatures as determined by the temperature of the pressurizing fluid in the system. After the above test has been completed or at desired points in the testing, valve 60 may be closed and valve 66 opened to conduct cool fluid through chamber 9 of the diaphragm system thereby cooling the material in its elongated condition. In this way, the tendency of the test material to shrink under temperature change can also be observed.

It should be understood that the above described system and order of test is intended to serve as an example of one of the uses of the invention. Variations in the system or order of test such as reversal of the systems and diaphragm chambers could be made without exceeding the intended scope of the invention.

What is claimed is:

1. A diaphragm type testing apparatus for determining the elongation characteristic of a material under controlled temperature conditions comprising: an expansible diaphragm system, a controlled fluid pressure system connected to said diaphragm system for expansion of the diaphragm thereof, said fluid pressure system including means to regulate the temperature of the fluid therein, means to retain a test specimen over said diaphragm system for testing thereof, whereby regulation of the temperature of the fluid in said pressure system during expansion of said diaphragm system provides a test of the elongation characteristic of the test specimen under controlled temperature conditions.

2. A diaphragm type testing apparatus for determining the elongation characteristic of a material under controlled temperature conditions comprising: an expansible dual diaphragm system, a fluid pressure system connected to said diaphragm system for expansion of the diaphragms therein, said fluid pressure system having means to regulate the temperature of the fluid therein, said fluid pressure system also having means to control the quantity and pressure of the fluid admitted to said diaphragm system, means to retain a test specimen over said diaphragm system for testing thereof, whereby regulation of the temperature of the fluid in said pressure system during expansion of said diaphragm system provides a test of the elongation characteristic of the test specimen under controlled temperature conditions.

3. A diaphragm type testing apparatus for determining the elongation and thermal dimensional variation characteristic of a material under controlled temperature conditions comprising: a dual diaphragm system having a pressure plate member and two expansible diaphragm members disposed in stacked relationship, said members defining two parallel sealed chambers therebetween, a fluid pressure system for each of said chamber, said systems having independent means to regulate the temperature of the fluid therein, said systems also having independent means to control the quantity of fluid admitted to each of said chambers, means to retain the test material over said diaphragm, whereby introduction of fluid pressure into the chamber furthest from the test material at a first regulated temperature expands said diaphragm system and provides a test of the elongation characteristic of the test material under controlled temperature conditions and subsequent introduction of fluid pressure into the chamber closest to the test material at a second regulated temperature changes the temperature of the diaphragm system and provides a test of the thermal dimensional variation characteristic of the test material.

4. A diphragam type test apparatus for determining the elongation and thermal dimensional variation characteristic of a material under controlled temperature conditions comprising; a pair of elastic diaphragms disposed in parallel spaced relationship and defining a closed pressure tight first chamber therebetween, a plate member disposed in close parallel relationship with one of said diaphragms, said plate and said diaphragm defining a closed pressure tight second chamber therebetween, a first means to supply fluid under controlled pressure and temperature to said first chamber, a second means to supply fluid under controlled pressure and temperature to said second chamber, means to retain the test material over said diaphragms for testing thereof, whereby introduction of fluid pressure into said second chamber at a regulated temperature expands said diaphragm system and provides a test of the elongation characteristics of the test material under controlled temperature conditions and subsequent introduction of fluid pressure into said first chamber at a different regulated temperature changes the temperature of the diaphragms and test material providing a test of the thermal dimensional variation characteristics of the material.

5. A diaphragm type test apparatus for determining the elongation and thermal dimensional variation characteristics of a material under controlled temperature conditions comprising in combination; a dual diaphragm system comprising in laminar relationship, a flat base plate, a first expansible diaphragm mounted to said base plate, said plate and said first diaphragm defining a first sealed chamber therebetween, a spacing member mounted around the periphery of said first diaphragm, a second expansible diaphragm mounted to said spacing member, said second diaphragm and said spacing member with said first diaphragm defining a second sealed chamber therebetween, a test material retaining member detachably mounted at the periphery of said second diaphragm to connect test material thereover; a fluid pressure source having means including piping and valves to connect said source to a first and second fluid pressure system, means including piping and valves to connect each of said systems to one of said chambers and to regulate the quantity of fluid admitted thereto; means in said first system to control the temperature of the fluid therein; independent means in said second system to control the temperature of the fluid therein; whereby introduction of fluid pressure from said first system into said first chamber at a first regulated temperature expands said diaphragm system and provides a test of the elongation characteristics of the test material under controlled temperature conditions and subsequent introduction of fluid pressure from said second system into said second chamber at a second regulated temperature changes the temperature of the diaphragm system and test material providing a test of the thermal dimensional variation characteristics of the material.

6. A diaphragm type test apparatus for determining the elongation and thermal dimensional variation characteristic of a material under controlled temperature conditions comprising in combination; a dual diaphragm system comprising in laminar relationship, a flat base plate, a first expansible diaphragm mounted thereto, said plate and said first diaphragm defining a first sealed chamber therebetween, a spacing member mounted around the periphery of said first diaphragm, a second expansible diaphragm mounted to said spacing member, said second diaphragm and said spacing member with said first diaphragm defining a sealed chamber therebetween, a diaphragm retaining member attached to the periphery of said second diaphragm, a test material retaining member detachably mounted to said diaphragm retaining member, a fluid pressure source having means including piping and valves to connect said source to a first and second fluid pressure system, means including piping and valves to connect each of said systems to one of said chambers and regulate the quantity of fluid admitted thereto; means in said first system to controllably heat the fluid therein; means in said second system to cool the fluid therein; whereby introduction of fluid pressure from said first pressure system into said first chamber at a regulated elevated temperature expands said diaphragm system and provides a test of the elongation characteristics of the test material under controlled temperature conditions and subsequent introduction of fluid pressure through said second system into said second chamber at a regulated lower temperature cools the diaphragm system and test material and provides a test of the thermal dimensional variation characteristics of the material.

7. The method of testing the elongation characteristic and ultimate strength of a material under controlled temperature conditions in a diaphragm type tester comprising applying fluid pressure to expand said diaphragm whereby the test material is stressed and controlling the temperature of said diaphragm pressurizing fluid whereby the temperature of the test material is regulated.

8. The method of claim 7 wherein the controlling of the temperature of the diaphragm pressurizing fluid comprises applying a second fluid, of different temperature than said fluid used to initially expand the diaphragm of the tester, between said initial fluid and the test material to change the temperature thereof.

References Cited by the Examiner

UNITED STATES PATENTS

| 1,116,118 | 11/14 | Putnam et al. | 73—102 |
| 2,950,620 | 8/60 | Magill | 73—102 X |

OTHER REFERENCES

Publication: Article by R. G. Loasby, "A Simple Volumenometer," published in Journal of Scientific Instruments, vol. 38, July 1961, page 306 (1 page).

RICHARD C. QUEISSER, *Primary Examiner.*